US007320036B1

(12) United States Patent  (10) Patent No.: US 7,320,036 B1
Carrel et al.  (45) Date of Patent: Jan. 15, 2008

(54) METHOD AND APPARATUS FOR MULTIPLE COMMUNICATIONS SESSIONS

(75) Inventors: David Carrel, San Francisco, CA (US); Che-Lin Ho, Zephyr Cove, NV (US); Dan Simone, Pleasanton, CA (US); Thomas Stoner, Fremont, CA (US)

(73) Assignee: Redback Networks Inc., San Jose, CA (US)

( * ) Notice: Subject to any disclaimer, the term of this patent is extended or adjusted under 35 U.S.C. 154(b) by 672 days.

(21) Appl. No.: 09/834,385

(22) Filed: Apr. 13, 2001

(51) Int. Cl.
*G06F 15/16* (2006.01)
(52) U.S. Cl. .................. 709/228; 709/203; 709/227; 709/229; 709/236
(58) Field of Classification Search .............. 709/704, 709/217, 214, 223, 246, 203, 227–229, 236; 370/35, 352
See application file for complete search history.

(56) References Cited

U.S. PATENT DOCUMENTS

| | | | | |
|---|---|---|---|---|
| 5,764,736 | A * | 6/1998 | Shachar et al. ........... | 379/93.09 |
| 6,011,909 | A * | 1/2000 | Newlin et al. ............. | 709/227 |
| 6,112,245 | A * | 8/2000 | Araujo et al. .............. | 709/228 |
| 6,356,934 | B1 * | 3/2002 | Delph ....................... | 709/204 |
| 6,442,610 | B1 * | 8/2002 | Khanna et al. ............ | 709/227 |
| 6,453,343 | B1 * | 9/2002 | Housel et al. ............. | 709/213 |
| 6,470,390 | B1 * | 10/2002 | Westfield .................. | 709/227 |
| 6,490,289 | B1 * | 12/2002 | Zhang et al. .............. | 709/227 |
| 6,522,880 | B1 * | 2/2003 | Verma et al. ............. | 370/331 |
| 6,587,883 | B1 * | 7/2003 | Rajakarunanayake ...... | 709/227 |
| 6,643,703 | B1 * | 11/2003 | Armistead et al. ........ | 709/238 |
| 6,715,082 | B1 * | 3/2004 | Chang et al. .............. | 713/201 |
| 6,718,388 | B1 * | 4/2004 | Yarborough et al. ...... | 709/227 |
| 6,763,012 | B1 * | 7/2004 | Lord et al. ................ | 370/338 |
| 6,778,525 | B1 * | 8/2004 | Baum et al. .............. | 370/351 |
| 6,829,250 | B2 * | 12/2004 | Voit et al. ................. | 370/401 |
| 6,850,982 | B1 * | 2/2005 | Siegel ....................... | 709/227 |
| 6,891,825 | B1 * | 5/2005 | O'Dell et al. ............. | 370/352 |
| 2001/0036192 | A1 * | 11/2001 | Chiles et al. ............. | 370/401 |

OTHER PUBLICATIONS

L.Mamakos et al., A Method for Transmitting PPP Over Ethernet, Network Working Group, RFC 2516, Feb. 1999.*
L. Mamakos, K. Lidl, J. Evarts, D. Carrel, D. Simone, and R. Wheeler, A Method for Transmitting PPP Over Ethernet (PPPoE), Network Working Group, RFC 2516, Feb. 1999.
Draft-Carrel-info-pppoe-ext-00; PPP Working Group, Internet Draft, Category: Informational, dated May 2000 (9 pgs).
The Windows 2000 IP Routing table (4 pgs) Feb. 28, 2000.
The OSI Model (4 pgs) 1999-2001.

* cited by examiner

*Primary Examiner*—Ario Etienne
*Assistant Examiner*—Ramy M Osman
(74) *Attorney, Agent, or Firm*—Blakely, Sokoloff, Taylor & Zafman LLP

(57) ABSTRACT

A method and apparatus for multiple communications sessions is described. In one embodiment of the invention, a computer implemented method comprises establishing a session at a data link layer between a host and a remote access concentrator, determining a set of network layer information corresponding to the session, and applying the set of network layer information to the host at the data link layer.

10 Claims, 5 Drawing Sheets

METHOD AND APPARATUS FOR MULTIPLE COMMUNICATIONS SESSIONS

BACKGROUND OF THE INVENTION

1. Field of the Invention

This invention relates to communications networks. More specifically, the present invention relates to communications sessions.

2. Description of the Related Art

Broadband access is available with a variety of technologies including wireless, cable, and DSL. A variety of network services have emerged in conjunction with the growth and advancement of broadband access. These services include video-conferencing, VoIP, video feeds, gaming services, etc. Delivery of these services and the end-user experience to access these services were enhanced by the Point to Point Protocol over Ethernet (PPPoE).

Point to Point Protocol over Ethernet (PPPoE) was developed to meet several goals. One goal was to provide the end-user a familiar dial-up style interface. Another goal was to connect multiple hosts at a remote site through the same customer premise equipment (CPE) ("A Method for Transmitting PPP over Ethernet", RFC 2516, 1999). PPPoE also satisfied the goal of introducing access control and billing functionality, which is inherent to PPP, to broadband access technology ("A Method for Transmitting PPP over Ethernet", RFC 2516, 1999). Although, multiple hosts could connect to the same CPE with PPPoE, each host can only open one session without additional configuration by the end-user.

An end-user cannot open another PPPoE session to use another service. The end-user must terminate a current PPPoE session and start a next session. An end-user can manually configure their machine for multiple PPPoE sessions, but the task is cumbersome and difficult.

SUMMARY OF THE INVENTION

A method and apparatus for multiple communications sessions is described. According to one embodiment of the invention, a method is provided for establishing a session at a data link layer between a host and a remote access concentrator and determining a set of network layer information corresponding to the session. In addition, the set of network information is applied to the host at the data link layer.

These and other aspects of the invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known protocols, structures and techniques have not been shown in detail in order not to obscure the invention.

Figure 1:
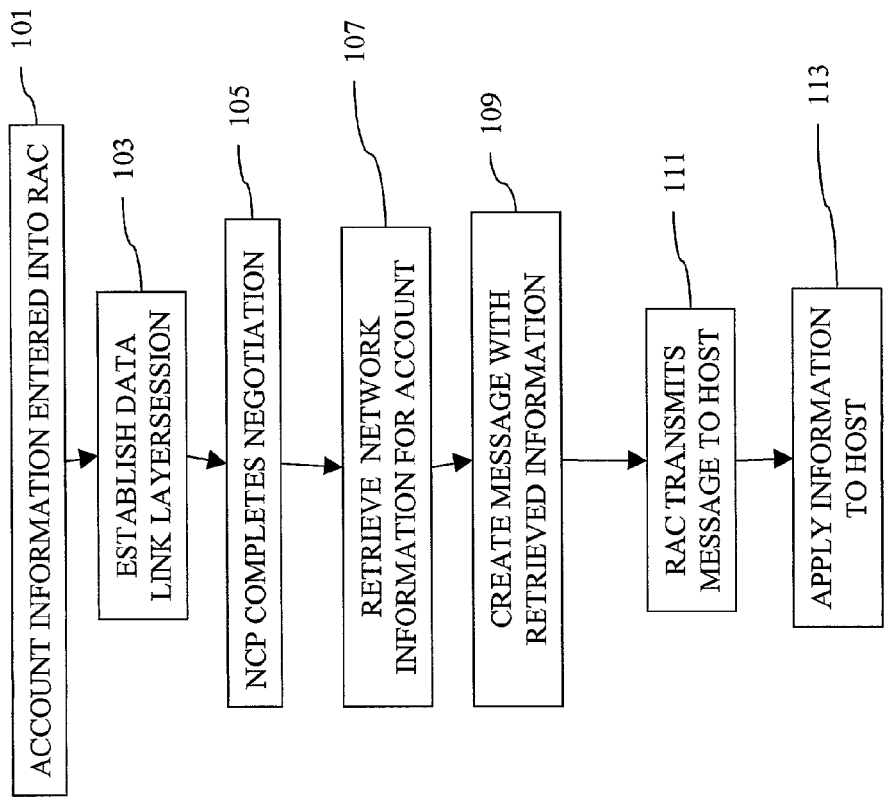
FIG. 1 is a flowchart for retrieving network level information according to one embodiment of the invention.

FIG. 1 is a flowchart for retrieving network level information according to one embodiment of the invention. At block 101, a network administrator enters network information for an account into a database. The database can be stored in a remote access concentrator (RAC) or can be stored separately from the RAC. At block 103, a data link layer session (e.g., PPPoE) is established between a host and the RAC. At block 105, a network control protocol (e.g., Internet Protocol Control Protocol, Internet Packet Exchange Control Protocol, NetBEUI Control Protocol, Appletalk Control Protocol, etc.) completes negotiation for the session. At block 107, the network information for the account accessed by the session is retrieved. At block 109, a message is created that includes the retrieved network information. At block 111, the message is transmitted from the RAC to the host. At block 113, the network information in the message is applied to the host.

Figure 2:
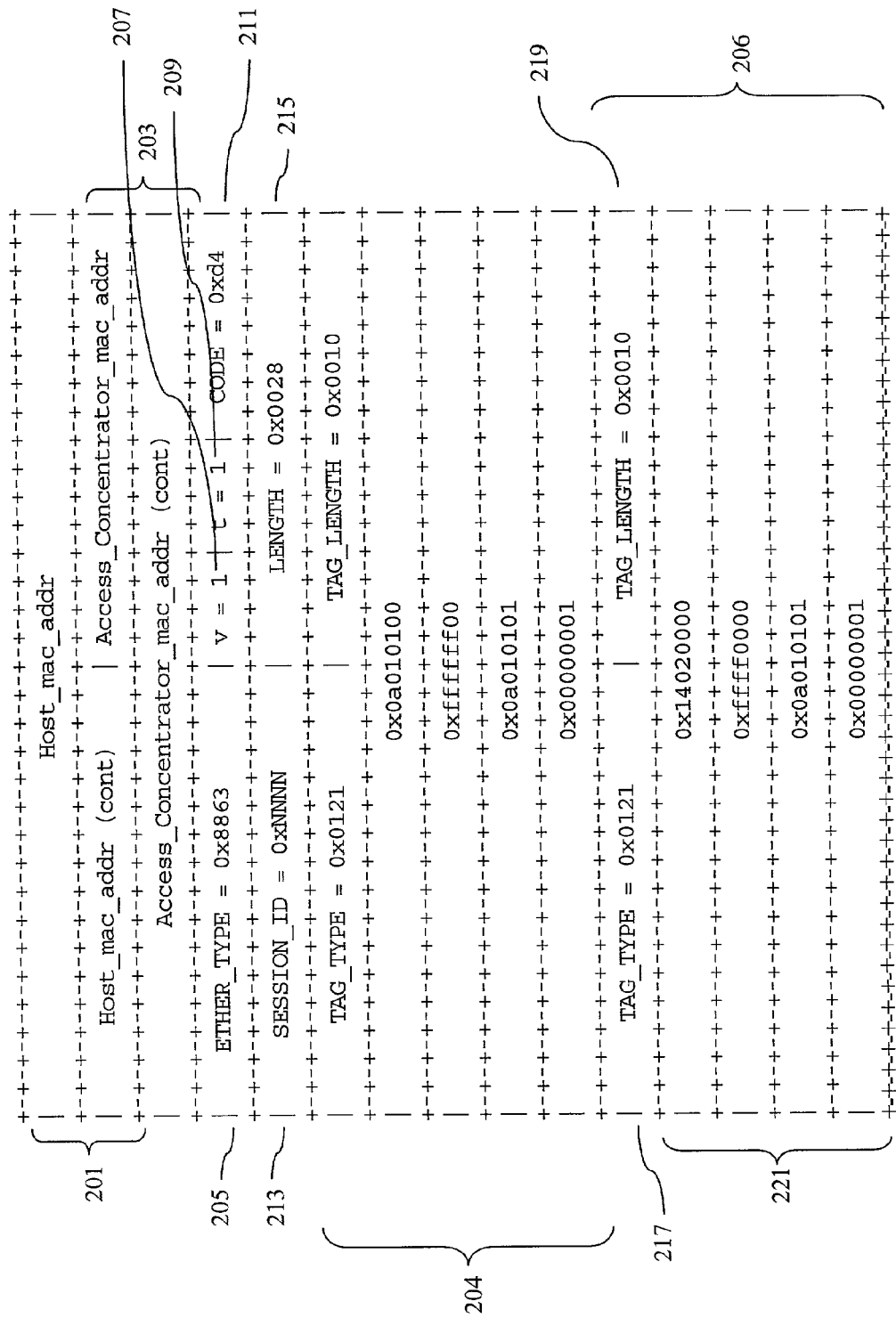
FIG. 2 is an exemplary diagram of a message to convey network layer information according to one embodiment of the invention.

FIG. 2 is an exemplary diagram of a message to convey network layer information according to one embodiment of the invention. In FIG. 2, a message is shown for an implementation of the invention with Internet Protocol Control Protocol (IPCP) as the NCP. The Active Discovery Network (ADN) message shown in FIG. 2 includes a field 201 for a host MAC address and a field 203 for a remote access concentrator's MAC address 203. The message also includes a field indicating the type of message 205 (e.g., discovery stage, session stage, etc.) and a code for the message 211. A field 207 and 209 indicate a version and type of protocol for the session respectively. A session ID field 213 uniquely identifies a session. A field 215 indicates the length of the message. The message shown in FIG. 2 includes two tags 204, 206. Both tags 204, 206 are IP_ROUTE_ADD tags. In other implementations, tags would correspond to the NCP being implemented. In this example, each tag includes a field 217 to indicate the type of tag and a field 219 to indicate the length of the tag. Each tag also includes a tag value field 221. The tag value field 221 indicates a destination network number, a destination network mask, a gateway IP address, and a metric value.

Several example illustrations of the invention are described with reference to FIGS. 3-5. These examples are based on an implementation using IPCP as the NCP. These examples are described as illustrations to aid in understanding the invention and not meant to be limiting upon the invention.

Figure 3:
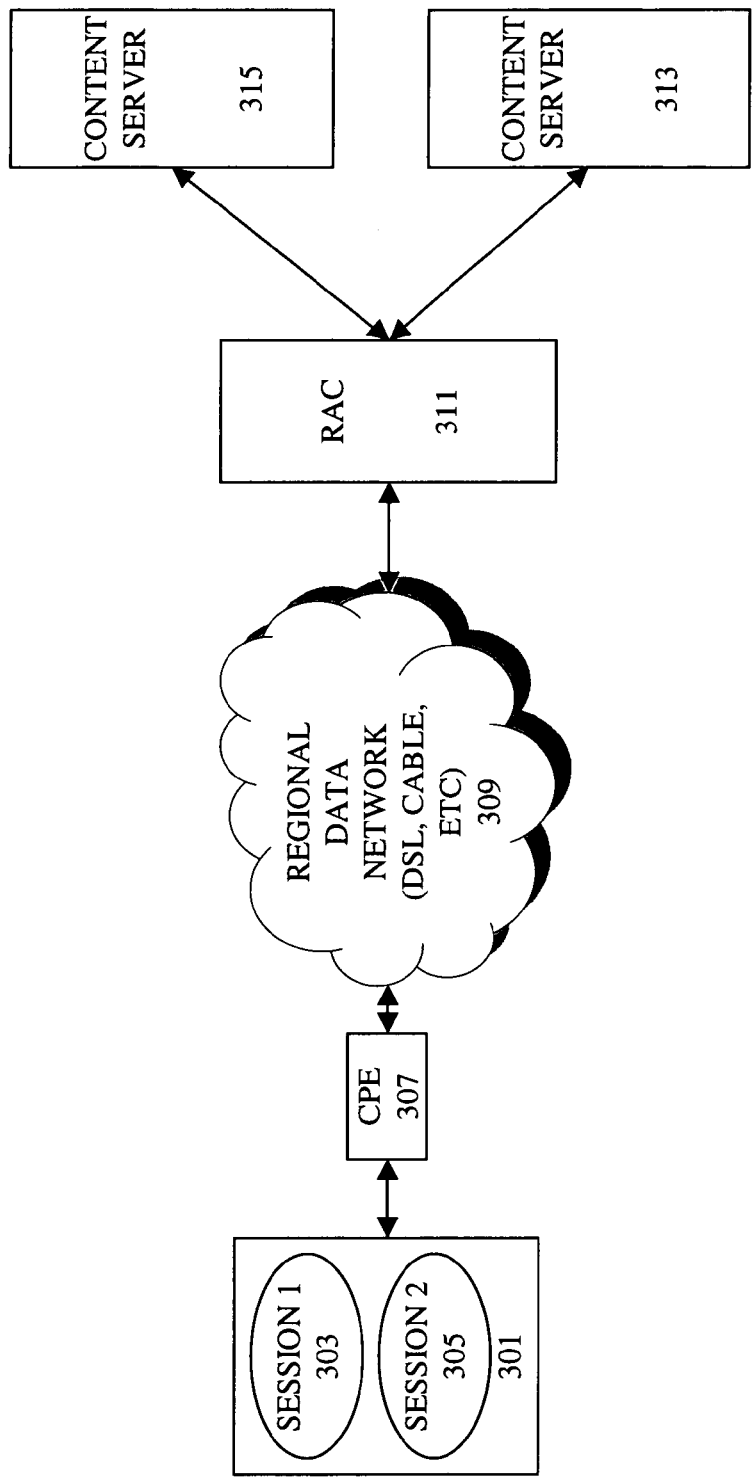
FIG. 3 is an exemplary diagram illustrating multiple communications sessions according to one embodiment of the invention.

FIG. 3 is an exemplary diagram illustrating multiple communications sessions according to one embodiment of the invention. In FIG. 3, a session 303 and a session 305 have been opened on a host 301. The host 301 is connected to a customer premise equipment (CPE) 307 (e.g., cable modem, DSL modem, etc.). Data is transmitted from the CPE 307 into a regional data network cloud 309 (e.g., DSL, cable, wireless, etc.). The data is received from the regional data network cloud 309 by a remote access concentrator (RAC) 311. Each session 303, 305 establishes a connection with the RAC 311. The RAC determines network information for an account corresponding to the session 303. The network information for the account corresponding to the session 303 indicates a content server 315. The RAC creates a message with network information for the content server 315 and its IP address, inserted as the gateway IP address in the message. The RAC then transmits the message to the session 303. The RAC also retrieves network information for the account corresponding to the session 305. This network information indicates a content server 313. The RAC creates a message for the session 305 with the network information for the content server 313 and the RAC's IP address as the gateway IP address. A user at the host 301 can open the session 303 to connect to the user's corporate network, assuming the content server 315 is a part of the corporate network. The user can open the session 305 to access the user's ISP. The content server 313 is in the ISPs point of presence (POP). Data corresponding to the session 303 flows on a path from the host 301 to the content server 315. Data corresponding to the session 305 follows a path from the host 301 to the content server 313.

Figure 4:
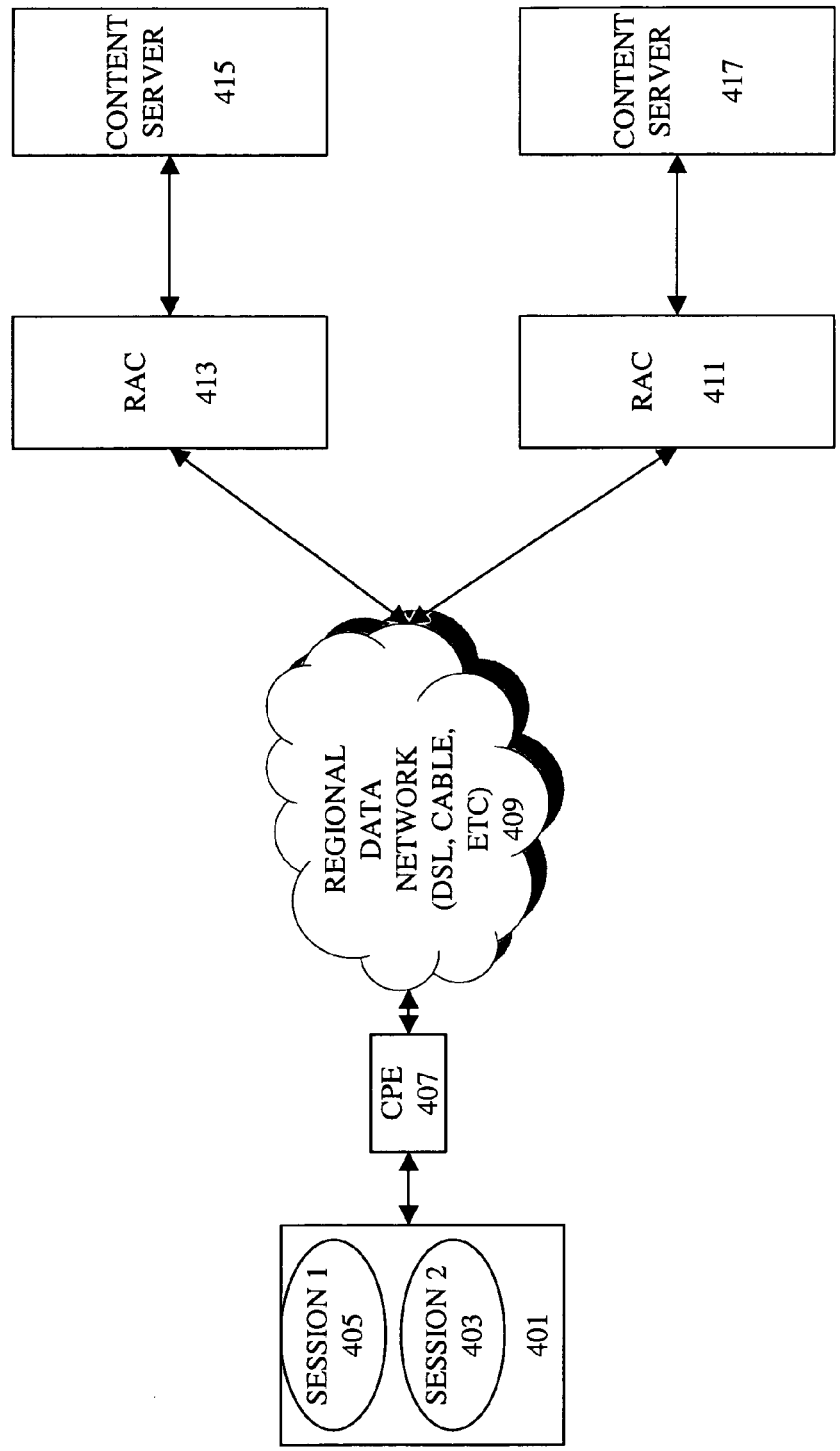
FIG. 4 is an exemplary diagram illustrating multiple communications sessions according to one embodiment of the invention.

FIG. 4 is an exemplary diagram illustrating multiple communications sessions according to one embodiment of the invention. In FIG. 4, a session 403 and a session 405 have been opened on a host 401. The host 401 connects to a CPE 405. The CPE 405 transmits data into a regional data network cloud 407. The regional data network cloud 407 forwards data to two remote access concentrators 411, 413. The session 405 establishes a connection with the RAC 413. The session 403 establishes a connection with the RAC 411. The RAC 413 retrieves network information for an account corresponding to the session 405. The network information for the account indicates a content server 415. The RAC creates a message including the network information of the content server 415 and the IP address of the RAC 413 as the gateway IP address. The RAC 413 transmits the message to the session 405. The RAC 411 retrieves network information for an account corresponding to the session 403. The network information for the account accessed by the session 403 indicates a content server 417. The RAC 411 creates a message with the network information for the content server 417 and the IP address of the RAC 411 as the gateway IP address. The host 401 inserts a route to the content server 415 with the information from the RAC 413 and a route to the content server 417 with the information from the RAC 411. In one example, a carrier which owns the regional data network opens their network to separate ISPs. The user at the host 401 has an account with both ISPs. One ISP owns the RAC 413 and offers a premium service (high-speed gaming, video, etc.). The other ISP offers e-mail and conventional access to the Internet. The user can access the premium service and the conventional Internet access with two sessions. Using the accounting features of PPP, each ISP can track use of their individual services for billing, monitoring, traffic control, etc.

Figure 5:
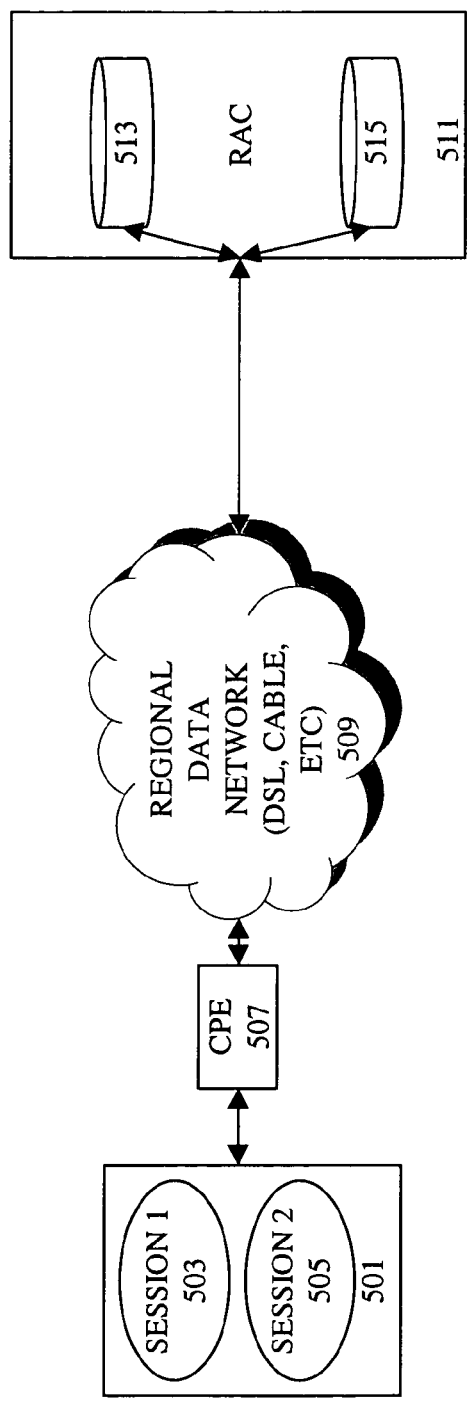
FIG. 5 is an exemplary diagram illustrating multiple communications sessions according to one embodiment of the invention.

FIG. 5 is an exemplary diagram illustrating multiple communications sessions according to one embodiment of the invention. In FIG. 5, a session 503 and a session 505 have been opened on a host 501. The host 501 connects to a CPE 507, which transmits data from the host into a regional data network cloud 509. Data from the regional data network cloud 509 is received at a network element 511. Both sessions 503 and 505 establish a connection with the network element 511. The network element 511 includes a virtual network element 513 and a virtual network element 515. The network element retrieves network information for an account corresponding to the session 503. The network information for that account indicates the virtual network element 513. The network element 511 creates a message with the network information and its IP address as the gateway IP address and transmits the message to the session 503. The network element 511 also accesses information for an account corresponding to the session 505. The network information for the account corresponding to the session 505 indicates the virtual network element 515. The network element creates a message with the network information of the virtual network element 515 and the IP address of the network element 511 as the gateway IP address. The network element 511 transmits the message to the session 505. A user may have an account with two separate Internet services. One service may offer conventional Internet access. Another service may offer guaranteed security for online purchases for a higher access price. The user would search for items in a session connecting to the conventional Internet service. When the user decides to purchase an item, the user can open a session to the more costly secure service to make the purchase.

Another example illustrating the use of multiple communications sessions involves service selection. A user may connect to a first service for video delivery. The first service is considered a premium service, thus being costly. The end-user opens a second session for web browsing. Without multiple PPPoE sessions, the end-user cannot browse the web without first terminating the first session or interrupting the costly premium service to perform web browsing.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. In another embodiment of the invention, NetBEUI routing information is carried in the ADN message and applied to the appropriate network stack on a host. In another embodiment of the invention, the message includes traffic shaping information.

The method and apparatus of the invention can be practiced with modification and alteration within the spirit and scope of the appended claims. The description is thus to be regarded as illustrative instead of limiting on the invention.

We claim:

1. A machine-readable medium having instructions stored therein, which when executed by a set of processors, cause said set of processors to perform operations comprising:

establishing a communications session between a host and a remote access concentrator through a customer premise equipment under a first of a plurality of accounts, where the customer premise equipment is separate from the host;

establishing a second communications session between the host and the remote access concentrator through the customer premise equipment under a second of the plurality of accounts without terminating the first communication session;

retrieving a set of network layer information corresponding to the first account;

retrieving a second set of network layer information, the second set of network information corresponding to the second account;

creating a message having the set of network layer information within a data link layer of the message;

creating a second message having the second set of network layer information within a data link layer of the message;

transmitting the message from the remote access concentrator to the host;

transmitting the second message from the remote access concentrator to the host;

extracting the set of network layer information from the message at the data link layer;

extracting the second set of network layer information from the second message;

applying the set of network layer information to the host to add, into the host, a route; and applying the second set of network layer information to the host.

2. The machine-readable medium of claim 1 further comprising:

establishing a second communications session between the host and a second remote access concentrator through a customer premise equipment under a second of the plurality of accounts without terminating the first communication session;

retrieving a second set of network layer information, the second set of network information corresponding to the second account;

creating a second message having the second set of network layer information within a data link layer of the message;

transmitting the second message from the second remote access concentrator to the host;

extracting the second set of network layer information from the second message; and applying the second set of network layer information to the host.

3. A machine-readable medium having instructions stored therein, which when executed by a set of processors, cause said set of processors to perform operations comprising:

establishing a Point to Point Protocol over Ethernet (PPPoE) session between a host to a remote access concentrator through a customer premise equipment, the PPPoE session being associated to an account, where the customer premise equipment is separate from the host;

establishing a second PPPoE session between the host and the remote access concentrator, the second PPPoE session being associated to a second account;

determining a set of network layer information corresponding to the account in the PPPoE session;

determining a second set of network layer information corresponding to the second account;

applying the set of network layer information to the host to add, into the host, a route; and applying the second set of network layer information to the host in the PPPoE session.

4. The machine-readable medium of claim 3 further comprising:

establishing a second PPPoE session between the host and a second remote access concentrator, the second PPPoE session being associated to a second account;

determining a second set of network layer information corresponding to the second account; and applying the second set of network layer information to the host in the PPPoE session.

5. A method comprising:

establishing multiple simultaneous PPPoE sessions for a single host to access a plurality of content servers through a set of one or more network elements, wherein one of the network elements in the set of network elements performs the following during the establishment of each of the PPPoE sessions, accessing network layer information previously entered for an account associated to the PPPoE session, wherein different accounts for different ones of the plurality of content servers include distinguishing network layer information, wherein each of the PPPoE sessions is associated to a different one of the accounts, creating a control protocol message with the accessed network layer information embedded therein, and transmitting the control protocol message to the host.

6. The method of claim 5, wherein the accessed network layer information is embedded in a data link layer of the control protocol message.

7. The method of claim 5, further comprising:

storing the previously entered network layer information in a database.

8. A method comprising:

a single host establishing multiple simultaneous PPPoE sessions for access to different ones of a plurality of content servers through a set of one or more remote access concentrators, wherein different accounts for different ones of the plurality of content servers include distinguishing network layer information, wherein each of the PPPoE sessions is associated to a different one of the accounts, wherein the single host performs the following during establishment of each of the PPPoE sessions, receiving from one of the set of remote access concentrators a control protocol message in which is embedded at least some of the distinguishing network layer information for the account accessed for the PPPoE session by the remote access concentrator, and adding a route to the one of the plurality of content servers identified by that network layer information.

9. The method of claim 8, wherein the network layer information is embedded in a data link layer of the control protocol message.

10. The method of claim 8, wherein the distinguishing network layer information is stored in a database that is external to the set of one or more remote access concentrators.

* * * * *